US010992439B2

(12) United States Patent
Lin et al.

(10) Patent No.: US 10,992,439 B2
(45) Date of Patent: Apr. 27, 2021

(54) METHOD AND APPARATUS FOR IMPLEMENTING REFERENCE SIGNAL TRANSMISSIONS IN A WIRELESS COMMUNICATION SYSTEM

(71) Applicant: ASUSTek Computer Inc., Taipei (TW)

(72) Inventors: Ko-Chiang Lin, Taipei (TW); Richard Lee-Chee Kuo, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/227,829

(22) Filed: Dec. 20, 2018

(65) Prior Publication Data

US 2019/0173629 A1 Jun. 6, 2019

Related U.S. Application Data

(62) Division of application No. 15/160,401, filed on May 20, 2016, now abandoned.

(Continued)

(51) Int. Cl.
*H04L 5/00* (2006.01)
*H04J 11/00* (2006.01)
(Continued)

(52) U.S. Cl.
CPC ............ *H04L 5/005* (2013.01); *H04L 5/0051* (2013.01); *H04B 7/0408* (2013.01);
(Continued)

(58) Field of Classification Search
CPC ....................................................... H04L 5/00
See application file for complete search history.

(56) References Cited

U.S. PATENT DOCUMENTS

2013/0064239 A1   3/2013  Yu
2013/0190027 A1*  7/2013  Cao ................... H04W 52/0206
                                                   455/509

(Continued)

FOREIGN PATENT DOCUMENTS

JP    2015070300    4/2015
WO    2013/024852   2/2013
(Continued)

OTHER PUBLICATIONS

European search report from corresponding EP Application No. 17208093.9, dated Apr. 13, 2018.

(Continued)

*Primary Examiner* — Sulaiman Nooristany
(74) *Attorney, Agent, or Firm* — Cooper Legal Group, LLC

(57) ABSTRACT

A method and apparatus for implementing reference signal transmissions in a wireless communication system. In one embodiment, the method includes the cell, transmission point (TP), or transmission and reception point (TRP) broadcasting a first RS periodically for measurement, wherein the first RS is transmitted at multiple occasions (or timings) in each period on different beams. The method also includes the cell, TP, or TRP transmitting a second RS to a UE for PDCCH demodulation, wherein the second RS is transmitted on multiple beams in a beam set of the UE in a subframe (or symbol) in which the PDCCH is transmitted.

14 Claims, 20 Drawing Sheets

Related U.S. Application Data

(60) Provisional application No. 62/174,817, filed on Jun. 12, 2015, provisional application No. 62/165,646, filed on May 22, 2015.

(51) Int. Cl.
 *H04W 16/28* (2009.01)
 *H04B 7/0408* (2017.01)

(52) U.S. Cl.
 CPC ........ *H04J 11/0073* (2013.01); *H04J 11/0076* (2013.01); *H04J 11/0079* (2013.01); *H04J 2011/0096* (2013.01); *H04L 5/0053* (2013.01); *H04W 16/28* (2013.01); *Y02D 30/70* (2020.08)

(56) References Cited

U.S. PATENT DOCUMENTS

| | | | | |
|---|---|---|---|---|
| 2013/0235851 | A1* | 9/2013 | Abu-Surra | H04J 11/0069 370/336 |
| 2017/0332288 | A1* | 11/2017 | Sadek | H04L 5/001 |

FOREIGN PATENT DOCUMENTS

| | | |
|---|---|---|
| WO | 2014/148783 | 9/2014 |
| WO | 2015/023910 | 2/2015 |
| WO | 2015020491 | 2/2015 |
| WO | 2015021410 | 2/2015 |
| WO | 2015080646 | 6/2015 |

OTHER PUBLICATIONS

Communication pursuant to Article 94(3) EPC from corresponding EP Application No. 17208093.9, dated Jun. 19, 2019.
Office Action from Japan Patent Office in corresponding JP Application No. 2018-149820, dated Oct. 8, 2019.
Office Action from Japan Patent Office in corresponding JP Application No. 2018/149820, dated May 26, 2020.
Corresponding Japanese Patent Application No. 2018-149820, Office Action dated Jan. 26, 2021. English Translation.

* cited by examiner

| Configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 7 (PRIOR ART)

| Configuration | | $N_{sc}^{RB}$ | $N_{symb}^{DL}$ |
|---|---|---|---|
| Normal cyclic prefix | $\Delta f = 15\,\text{kHz}$ | 12 | 7 |
| Extended cyclic prefix | $\Delta f = 15\,\text{kHz}$ | | 6 |
| | $\Delta f = 7.5\,\text{kHz}$ | 24 | 3 |

FIG. 9 (PRIOR ART)

METHOD AND APPARATUS FOR IMPLEMENTING REFERENCE SIGNAL TRANSMISSIONS IN A WIRELESS COMMUNICATION SYSTEM

CROSS-REFERENCE TO RELATED APPLICATIONS

This application is a Divisional of U.S. patent application Ser. No. 15/160,401, filed May 20, 2016, which claims the benefits of U.S. Provisional Patent Application Ser. No. 62/165,646 filed on May 22, 2015 and U.S. Provisional Patent Application Ser. No. 62/174,817 filed on Jun. 12, 2015, the entire disclosures of which are incorporated herein in their entirety by reference.

FIELD

This disclosure generally relates to wireless communication networks, and more particularly, to a method and apparatus for implementing reference signal transmissions in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus for implementing reference signal transmissions in a wireless communication system. In one embodiment, the method includes the cell, transmission point (TP), or transmission and reception point (TRP) broadcasting a first RS periodically for measurement, wherein the first RS is transmitted at multiple occasions (or timings) in each period on different beams. The method also includes the cell, TP, or TRP transmitting a second RS to a UE (User Equipment) for PDCCH (Physical Downlink Control Channel) demodulation, wherein the second RS is transmitted on multiple beams in a beam set of the UE in a subframe (or symbol) in which the PDCCH is transmitted.

BRIEF DESCRIPTION OF THE DRAWINGS

FIG. 7 is a reproduction of Table 5.1-1 of 3GPP TS 36.300.

FIG. 9 is a reproduction of Table 6.2.3-1 of 3GPP TS 36.211.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support the wireless technology discussed in the various documents, including: "DOCOMO 5G White Paper" by NTT Docomo, Inc. and METIS Deliverable D2.4, "Proposed solutions for new radio access". Furthermore, the exemplary wireless communication systems devices described below may be designed to support one or more standards such as the standard offered by a consortium named "3rd Generation Partnership Project" referred to herein as 3GPP, including: TS 36.300 V12.5.0, "E-UTRA and E-UTRAN Overall description"; 3GPP TS 36.211 V12.5.0, "E-UTRA Physical channels and modulation"; TS 36.331 V12.5.0, "E-UTRA RRC protocol specification"; TS 36.213 V12.3.0, "E-UTRA Physical layer procedures"; and TS 36.321 V12.5.0, "E-UTRA MAC protocol specification". The standards and documents listed above are hereby expressly incorporated by reference in their entirety.

Figure 1:
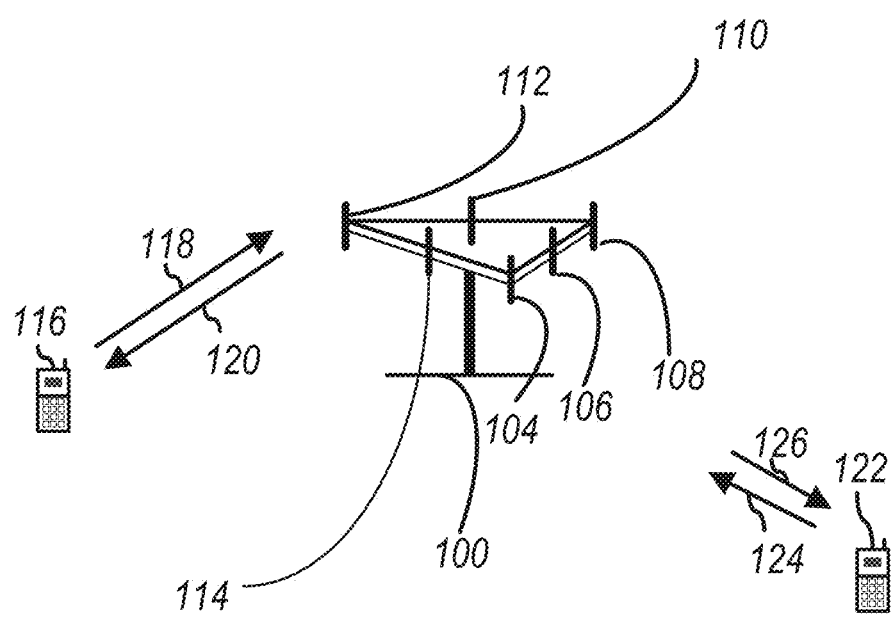
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a singe antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
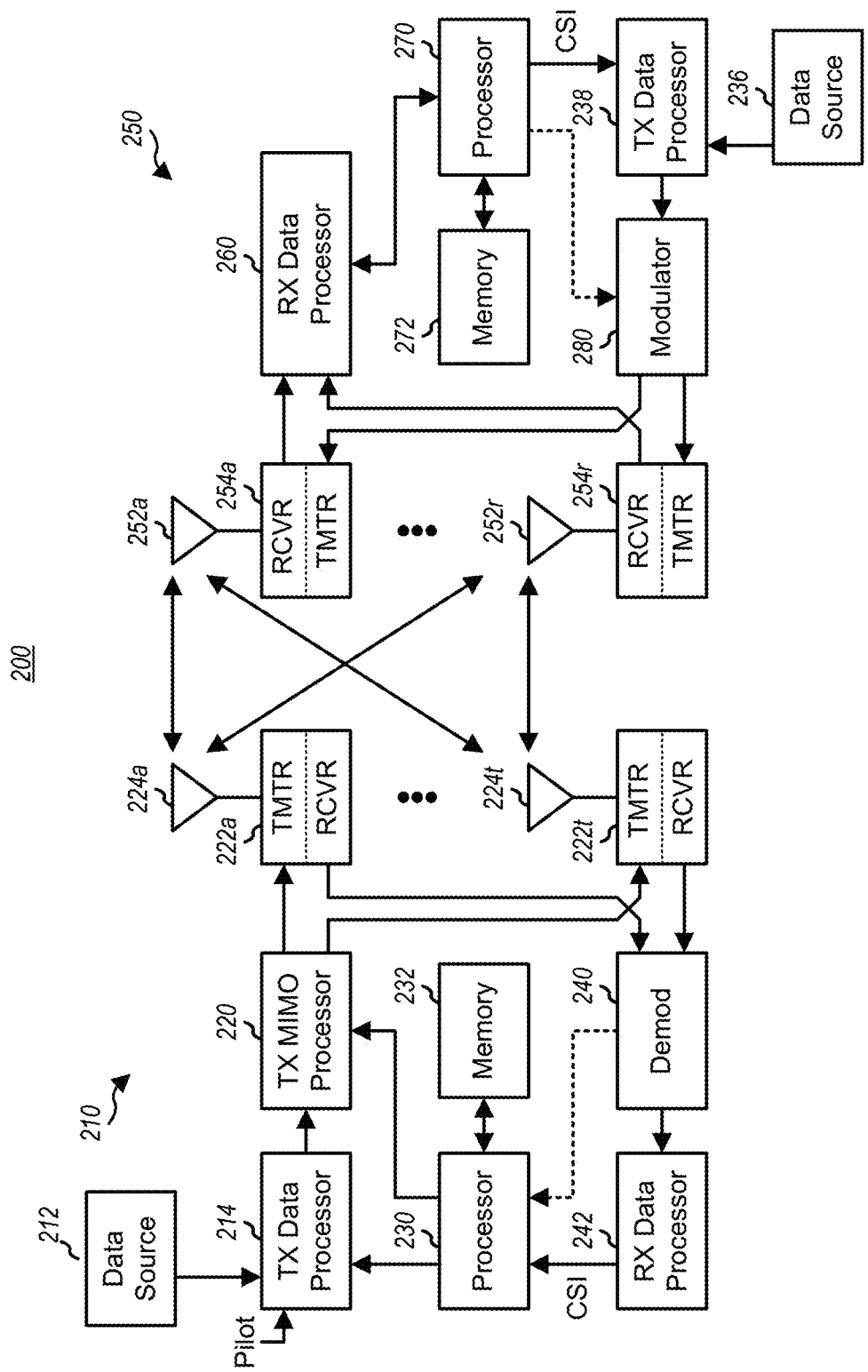
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
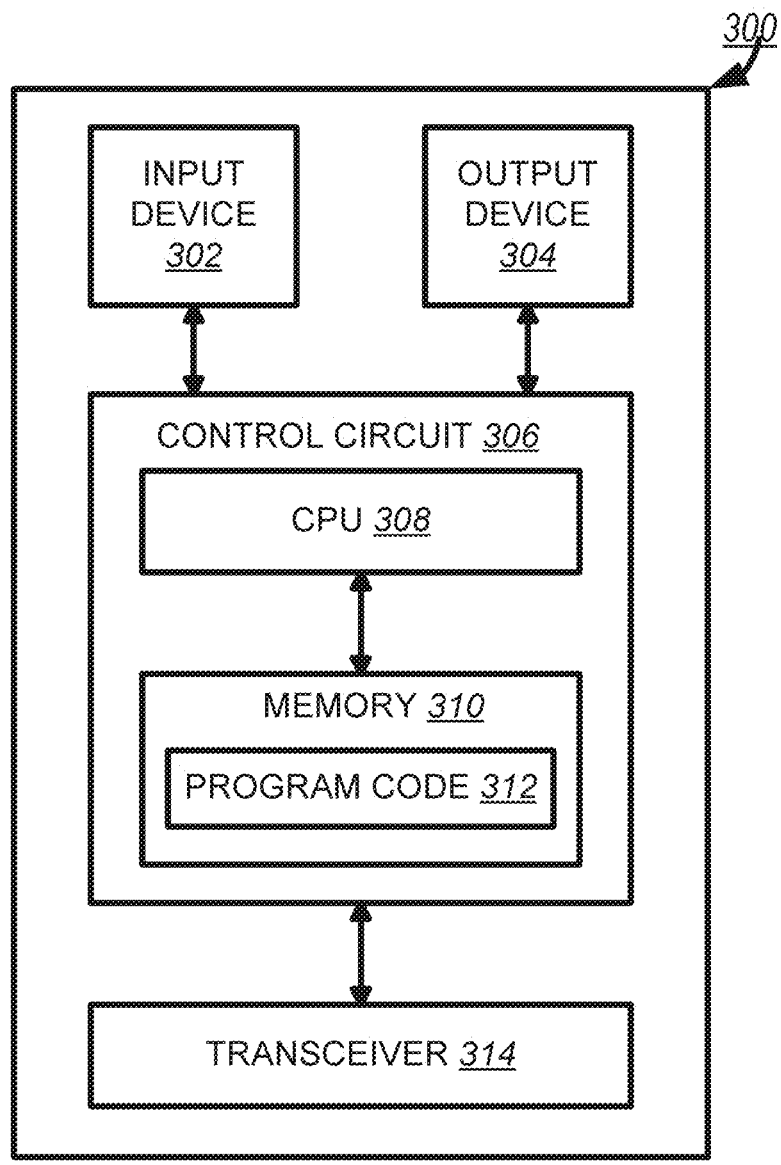
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314.

The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
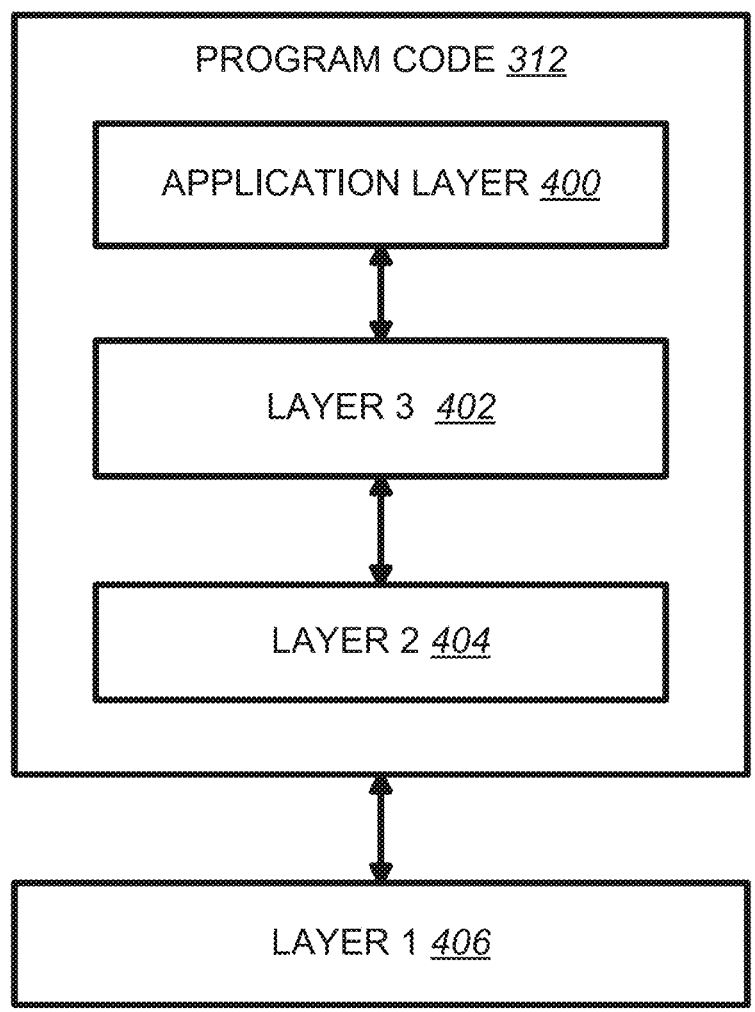
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

The concept of radio access for 5G is described in the DOCOMO 5G White Paper. One key point is to efficiently integrate both lower and higher frequency bands. Higher frequency bands provide opportunities for wider spectrum but have coverage limitations because of higher path loss. The DOCOMO 5G White Paper proposes that 5G system has a two-layer structure that consists of a coverage layer (e.g., consisting of macro cell(s)) and a capacity layer (e.g., consisting of small cell(s) or phantom cell(s)). The coverage layer generally uses existing lower frequency bands to provide basic coverage and mobility. The capacity layer generally uses new higher frequency bands to provide high data rate transmission. The coverage layer could be supported by enhanced LTE RAT (Long Term Evolution Radio Access Technology) while the capacity layer could be supported by a new RAT dedicated to higher frequency bands. The efficient integration of the coverage and capacity layers is enabled by the tight interworking (dual connectivity) between the enhanced LTE RAT and the new RAT. In the new radio technology for the next generation (e.g., 5G), an eNB may alternatively control multiple transmission points (TPs) or transmission and reception point (TRPs) to form a virtual cell for supporting the capacity layer.

Dual connectivity, as discussed in 3GPP TS 36.300, is a mode of operation of a UE in RRC_CONNECTED, configured with a Master Cell Group (i.e., a group of serving cells associated with the MeNB, comprising of the PCell (Primary Cell) and optionally one or more SCells (Secondary Cell)) and a Secondary Cell Group (i.e., a group of serving cells associated with the SeNB, comprising of PSCell (Primary Secondary Cell) and optionally one or more SCells). A UE configured with dual connectivity means that the UE is configured to utilize radio resources provided by two distinct schedulers, located in two eNBs, including MeNB (Master eNB) and SeNB (Secondary eNB) connected via a non-ideal backhaul over the X2 interface. Further details of dual connectivity could be found in 3GPP TS 36.300.

Furthermore, cells, TPs, or TRPs on the capacity layer may use beamforming. Beamforming is a signal processing technique used in antenna arrays for directional signal transmission or reception. This is generally achieved by combining elements in a phased array in such a way that signals at particular angles experience constructive interference while others experience destructive interference. Beamforming can be used at both the transmitting and receiving ends in order to achieve spatial selectivity. The improvement compared with omnidirectional reception/transmission is generally known as the receive/transmit gain.

Beam forming is frequently applied in radar systems. The beam created by a phased array radar is comparatively narrow and highly agile compared to a moving dish. This characteristic gives the radar the ability to detect small, fast targets like ballistic missiles in addition to aircrafts.

The benefit of co-channel interference reduction also makes beamforming attractive to a mobile communication system designer. U.S. Patent Publication No. 2010/0165914 generally discloses the concept of beam division multiple access (BDMA) based on beamforming technique. In BDMA, a base station can communicate with a mobile device via a narrow beam to obtain the receive/transmit gain. Besides, two mobile devices in different beams can share the same radio resources at the same time and thus the capacity of a mobile communication system can increase greatly. To achieve that, the base station should know in which beam a mobile device is located.

Frame structure in LTE, as discussed in 3GPP TS 36.300, is organized into radio frames and each radio frame (e.g., 10 ms) is divided into ten subframes. Each subframe may include two slots:

5 Physical Layer for E-UTRA

Downlink and uplink transmissions are organized into radio frames with 10 ms duration. Two radio frame structures are supported:

Type 1, applicable to FDD;

Type 2, applicable to TDD.

Figure 5:
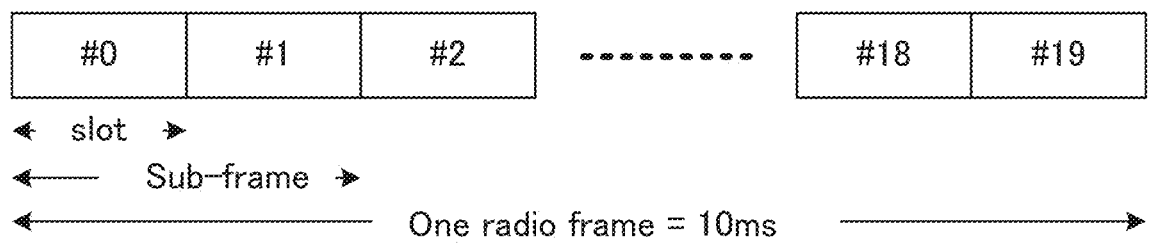
FIG. 5 is a reproduction of Figure 5.1-1 of 3GPP TS 36.300.

Frame structure Type 1 is illustrated in Figure 5.1-1. Each 10 ms radio frame is divided into ten equally sized subframes. Each sub-frame consists of two equally sized slots. For FDD, 10 subframes are available for downlink transmission and 10 subframes are available for uplink transmissions in each 10 ms interval. Uplink and downlink transmissions are separated in the frequency domain.

Figure 5.1-1: Frame Structure Type 1 [is Reproduced as FIG. 5 of the Present Application]

Frame structure Type 2 is illustrated in Figure 5.1-2. Each 10 ms radio frame consists of two half-frames of 5 ms each. Each half-frame consists of eight slots of length 0.5 ms and three special fields: DwPTS, GP and UpPTS. The length of DwPTS and UpPTS is configurable subject to the total length of DwPTS, GP and UpPTS being equal to 1 ms. Both 5 ms and 10 ms switch-point periodicity are supported. Subframe 1 in all configurations and subframe 6 in configuration with 5 ms switch-point periodicity consist of DwPTS, GP and UpPTS. Subframe 6 in configuration with 10 ms switch-point periodicity consists of DwPTS only. All other subframes consist of two equally sized slots.

For TDD, GP is reserved for downlink to uplink transition. Other Subframes/Fields are assigned for either downlink or uplink transmission. Uplink and downlink transmissions are separated in the time domain.

Figure 5.1-2: Frame Structure Type 2 (for 5 ms Switch-Point Periodicity) [is Reproduced as FIG. 6 of the Present Application]

Table 5.1-1: Uplink-Downlink Allocations [is Reproduced as FIG. 7 of the Present Application]

Figure 6:
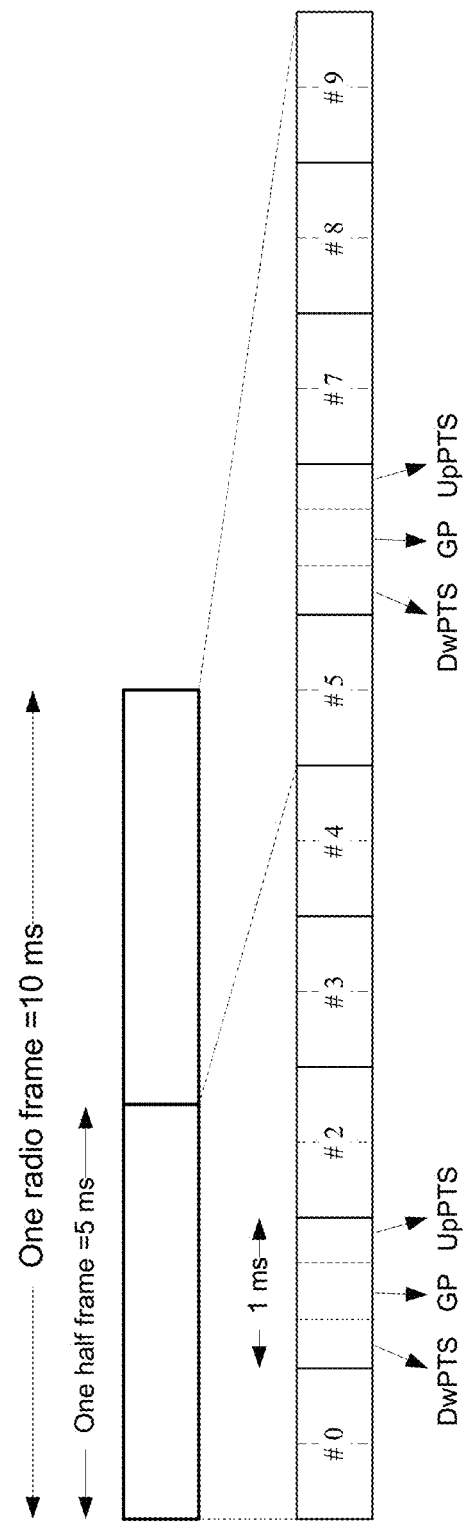
FIG. 6 is a reproduction of Figure 5.1-2 of 3GPP TS 36.300.
Figure 8:
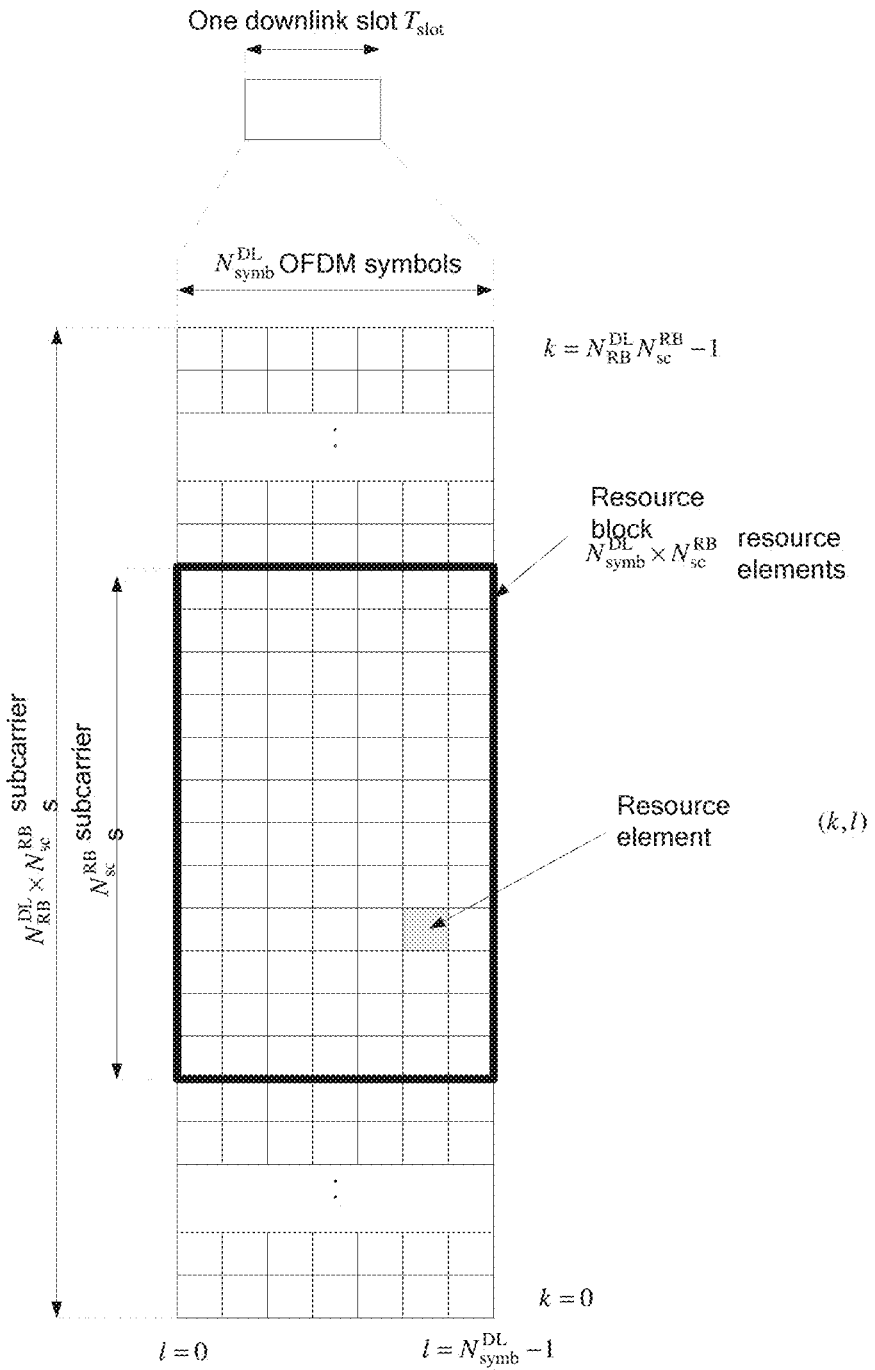
FIG. 8 is a reproduction of Figure 6.2.2-1 of 3GPP TS 36.211.

Each downlink slot includes $N_{symb}^{DL}$ OFDM symbols as shown in the following Figure 6.2.2-1 and Table 6.2.3-1 of 3GPP TS 36.211, which are reproduced respectively as FIGS. 8 and 9 of the present application.

System Frame Number (SFN) is changed periodically and provided by system information, i.e., MasterInformationBlock (as discussed in 3GPP 36.331), to help UEs identify the frame number of a radio frame. MasterInformationBlock not only includes SFN but also other parameters (e.g., dl-Bandwidth and phich-Config) as follows:

MasterInformationBlock

The MasterInformationBlock includes the system information transmitted on BCH.

Signalling radio bearer: N/A

RLC-SAP: TM

Logical channel: BCCH

Direction: E-UTRAN to UE

| MasterInformationBlock |  |
| --- | --- |
| -- ASN1START |  |
| MasterInformationBlock ::= | SEQUENCE { |
| dl-Bandwidth | ENUMERATED { |
|  | n6, n15, n25, n50, n75, n100}, |
| phich-Config | PHICH-Config, |
| systemFrameNumber | BIT STRING (SIZE (8)), |
| spare | BIT STRING (SIZE (10)) |
| } |  |
| -- ASN1STOP |  |

| MasterInformationBlock field descriptions |
| --- |
| dl-Bandwidth |
| Parameter: transmission bandwidth configuration, $N_{RB}$ in downlink, see TS 36.101 [42, table 5.6-1]. n6 corresponds to 6 resource blocks, n15 to 15 resource blocks and so on. |
| systemFrameNumber |
| Defines the 8 most significant bits of the SFN. As indicated in TS 36.211 [21, 6.6.1], the 2 least significant bits of the SFN are acquired implicitly in the P-BCH decoding, i.e. timing of 40 ms P-BCH TTI indicates 2 least significant bits (within 40 ms P-BCH TTI, the first radio frame: 00, the second radio frame: 01, the third radio frame: 10, the last radio frame: 11). One value applies for all serving cells of a Cell Group (i.e. MCG or SCG). The associated functionality is common (i.e. not performed independently for each cell). |

Based on SFN, the UE can determine the timing to perform UL (Uplink) transmission, e.g., for SR (Scheduling Request), SRS (Sounding Reference Signal), CSI (Channel State Information) reporting, and/or Random Access Preamble, as discussed in 3GPP TS 36.211, TS 36.331, and TS 36.213. Or SFN may be used by UE to determine the Active Time for DRX (Discontinuous reception) operation as discussed in 3GPP TS 36.321.

MIB is carried by the first four (4) symbols in the second slot of the first subframe in a radio frame as discussed in 3GPP TS 36.211 as follows:

6.6.4 Mapping to Resource Elements

The block of complex-valued symbols $y^{(p)}(0), \ldots, y^{(p)}(M_{symb}-1)$ for each antenna port is transmitted during 4 consecutive radio frames starting in each radio frame fulfilling $n_f \bmod 4=0$ and shall be mapped in sequence starting with y(0) to resource elements (k,l). The mapping to resource elements (k,l) not reserved for transmission of reference signals shall be in increasing order of first the index k, then the index l in slot 1 in subframe 0 and finally the radio frame number. The resource-element indices are given by $$k = \frac{N_{RB}^{DL} N_{sc}^{RB}}{2} - 36 + k', k' = 0, 1, \ldots, 71$$

$$l = 0, 1, \ldots, 3$$

where resource elements reserved for reference signals shall be excluded. The mapping operation shall assume cell-specific reference signals for antenna ports 0-3 being present irrespective of the actual configuration. The UE shall assume that the resource elements assumed to be reserved for reference signals in the mapping operation above but not used for transmission of reference signal are not available for PDSCH transmission. The UE shall not make any other assumptions about these resource elements.

The main purpose of transmission of synchronization signals, such as PSS (Primary Synchronization Signal) and SSS (Second Synchronization Signal) in a cell is for UEs in the cell to obtain the downlink timing (i.e., the radio frame boundary and subframe boundary). PSS and SSS are each carried by one symbol different from symbols which carry SFN as discussed in 3GPP TS 36.211 as follows:

6.11.1.2 Mapping to Resource Elements

The mapping of the sequence to resource elements depends on the frame structure. The UE shall not assume that the primary synchronization signal is transmitted on the same antenna port as any of the downlink reference signals. The UE shall not assume that any transmission instance of the primary synchronization signal is transmitted on the same antenna port, or ports, used for any other transmission instance of the primary synchronization signal. The sequence d(n) shall be mapped to the resource elements according to $$a_{k,l} = d(n), n = 0, \ldots, 61$$

$$k = n - 31 + \frac{N_{RB}^{DL} N_{sc}^{RB}}{2}$$

For frame structure type 1, the primary synchronization signal shall be mapped to the last OFDM symbol in slots 0 and 10.

For frame structure type 2, the primary synchronization signal shall be mapped to the third OFDM symbol in subframes 1 and 6. Resource elements (k,l) in the OFDM symbols used for transmission of the primary synchronization signal where $$k = n - 31 + \frac{N_{RB}^{DL} N_{sc}^{RB}}{2}$$

$$n = -5, -4, \ldots, -1, 62, 63, \ldots 66$$

are reserved and not used for transmission of the primary synchronization signal.

6.11.2.2 Mapping to Resource Elements

The mapping of the sequence to resource elements depends on the frame structure. In a subframe for frame structure type 1 and in a half-frame for frame structure type 2, the same antenna port as for the primary synchronization signal shall be used for the secondary synchronization signal.

The sequence d(n) shall be mapped to resource elements according to $$a_{k,l} = d(n), n = 0, \ldots, 61$$

$$k = n - 31 + \frac{N_{RB}^{DL} N_{sc}^{RB}}{2}$$

$$l = \begin{cases} N_{symb}^{DL} - 2 & \text{in slots 0 and 10 for frame structure type 1} \\ N_{symb}^{DL} - 1 & \text{in slots 1 and 11 for frame structure type 2} \end{cases}$$

Resource elements (k,l) where $$k = n - 31 + \frac{N_{RB}^{DL} N_{sc}^{RB}}{2}$$

$$l = \begin{cases} N_{symb}^{DL} - 2 & \text{in slots 0 and 10 for frame structure type 1} \\ N_{symb}^{DL} - 1 & \text{in slots 1 and 11 for frame structure type 2} \end{cases}$$

$$n = -5, -4, \ldots, -1, 62, 63, \ldots 66$$

are reserved and not used for transmission of the secondary synchronization signal.

Figure 10:
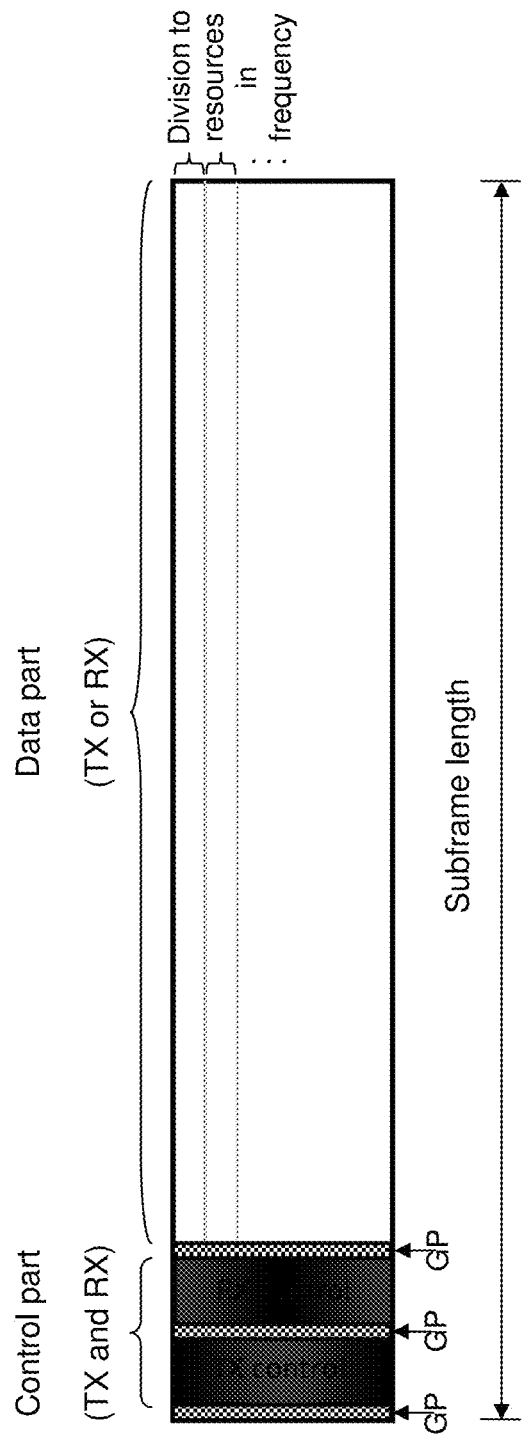
FIG. 10 shows a physical subframe structure according to one exemplary embodiment.

A TDD optimized physical subframe structure for a UDN system proposed by METIS Deliverable D2.4 is illustrated in FIG. 10, which adopts the main design principles listed below:

A bi-directional (including both DL and UL resources) control part is embedded to the beginning of each subframe and time-separated from data part.

Data part in one subframe contains data symbols for either transmission or reception. Demodulation reference signal (DMRS) symbols, used to estimate the channel and its covariance matrix, are located e.g. in the first OFDM symbol in the dynamic data part and can be precoded with the same vector/matrix as data.

Short subframe lengths, such as e.g. 0.25 ms on cmW frequencies when assuming 60 kHz SC spacing, are feasible. By following the principles of harmonized OFDM concept, the frame numerology is further scaled when moving to mmW, leading to even shorter frame length, e.g. in the order of 50 μs.

In frequency direction, the spectrum can be divided to separate allocable frequency resources.

The bi-directional control part of the subframe allows the devices in the network to receive and send control signals, such as scheduling requests (SRs) and scheduling grants (SGs), in every subframe. In addition to the scheduling related control information, the control portion may also contain reference signals (RS) and synchronization signals used for cell detection and selection, scheduling in frequency domain, precoder selection, and channel estimation.

In LTE, cell-specific reference signals (CRS) are transmitted in all downlink subframes in a cell, as discussed in 3GPP TS 36.211. Thus CRS can be used to support UE measurements (e.g., Reference Signal Received Power (RSRP) or Reference Signal Received Quality (RSRQ)) and PDCCH (Physical Downlink Control Channel) demodulation.

Regarding reference signals (RS), MITIS Deliverable D2.4 states: "[i]n addition to the scheduling related control information, the control part in the TDD subframe structure may also contain reference signals (RS) and synchronization signals used for cell detection and selection, scheduling in frequency domain, precoder selection and channel estimation."

To find beam(s) in which a UE can communicate with a base station, it is proposed in the DOCOMO 5G White Paper that the UE transmits its position and speed to the base station and then the base station determines the direction of a downlink beam for the UE according to the received position and speed. In this way, however, the base station may not able to determine the UE's beams accurately, due to the very complicated propagation environment in mobile cellular systems. For example, the line of sight (LOS) between the UE and the base station may be blocked and communication may proceed via other paths (non LOS). In addition, typically not all UEs in a cell are equipped with positioning capability (e.g., low end devices). As a result, the benefit of BDMA (Beam Division Multiple Access) cannot be enjoyed if there are many low end devices in a cell. Other ways for a base station to determine UE's beams could be considered.

U.S. Provisional Application Ser. No. 62/107,814 entitled "Method and Apparatus for Beam Tracking in a Wireless Communication System" considers the beam pattern applied by a base station for transmission and/or reception in a cell as fixed. That is the number and the beam-widths of beams in a cell are fixed, while the beam-widths of beams in different directions could be same or different. Due to multiple propagation paths or overlapping between two neighboring beams, it is likely that multiple beams may be used by a UE for communicating with the base station. In this situation, the base station needs to determine the beam set used by a UE.

Figure 11:
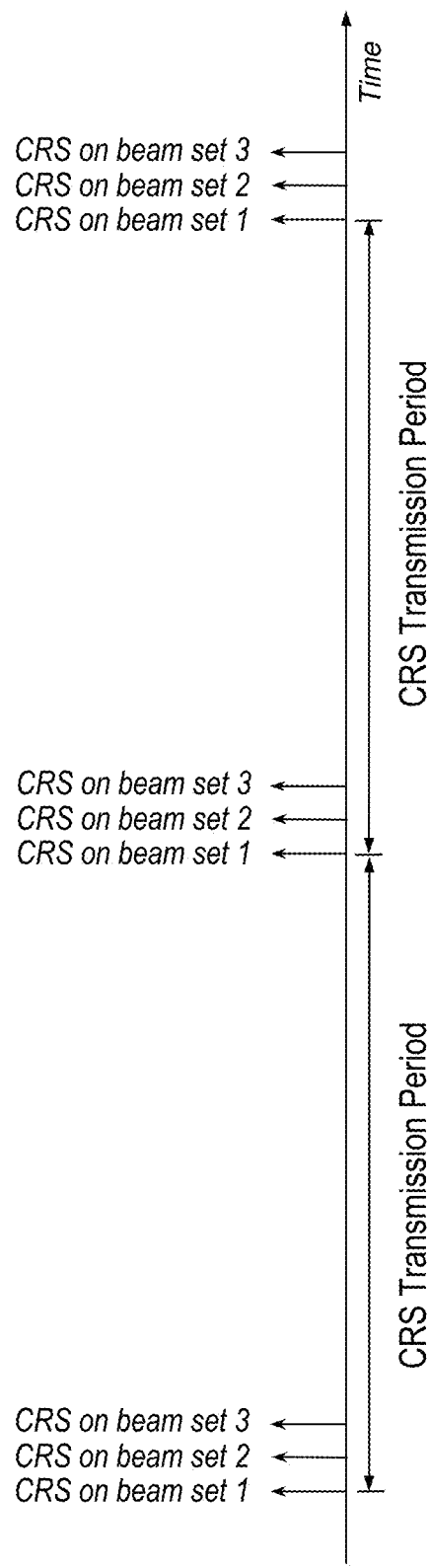
FIG. 11 is a timing diagram of CRS (Cell-specific Reference Signal) transmissions according to one exemplary embodiment.

Considering the enlarged number of antennas with wider bandwidth, it is quite challenging in terms of overall cost and power consumption to implement beamforming in a cell, TP, or TRP with one transceiver per antenna element. As a result, the maximum number of beams which can be generated by a cell, TP, or TRP at one time could be less than the total number of beams covered by a cell, TP, or TRP e.g. if a hybrid beamformer consisting of an analog beamformer and digital preceding is employed by the cell, TP, or TRP. Thus, it may take several times for the cell, TP, or TRP to scan all beams of the cell, TP, or TRP for completing a round of CRS transmissions and each time CRS is transmitted on predefined beams (i.e. a beam set). As shown in FIG. 11, there are three (3) beam sets in the cell. In each CRS transmission period, CRS transmission is performed per beam set on all beams in each beam set. Furthermore, it takes three (3) CRS transmissions in one CRS transmission period to complete a round of CRS transmissions for all the beam sets.

Figure 12:
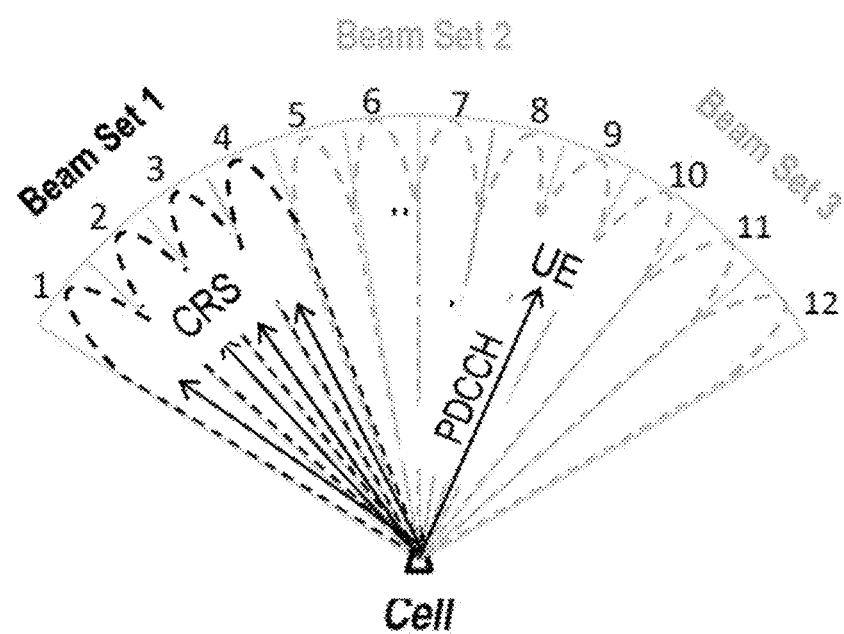
FIG. 12 is a diagram of CRS and PDCCH transmissions according to one exemplary embodiment.

In LTE, a UE performs PDCCH demodulation according to channel estimation on CRS (Cell-specific Reference Signal). It is presumed that channel estimation for PDCCH demodulation in a cell, TP, or TRP applying beamforming should be done in beam domain (i.e., a UE needs to detect CRS on those beams used for PDCCH transmission to the UE). However, it is not always possible for a UE to receive CRS in every subframe if a hybrid beamformer is used, because CRS may not be present in the subframe where the PDCCH is transmitted. Even if CRS may be present in the same subframe as PDCCH, it is possible that CRS and PDCCH are transmitted on different beams. For example, as shown in FIG. 12, CRS is transmitted on beams 1, 2, 3, & 4, while PDCCH is transmitted to the UE on beam 9. Therefore, it is not feasible for UEs to rely on CRS for PDCCH demodulation. Thus, in addition to CRS for UE measurements (e.g., RSRP or RSRQ), a new RS (e.g., DMRS) needs to be defined in a cell, TP, or TRP to accompany the PDCCH transmission for demodulation purpose. One potential way is for the base station to transmit the DMRS in the same subframe (or symbol) in which the PDCCH is transmitted.

Figure 13:
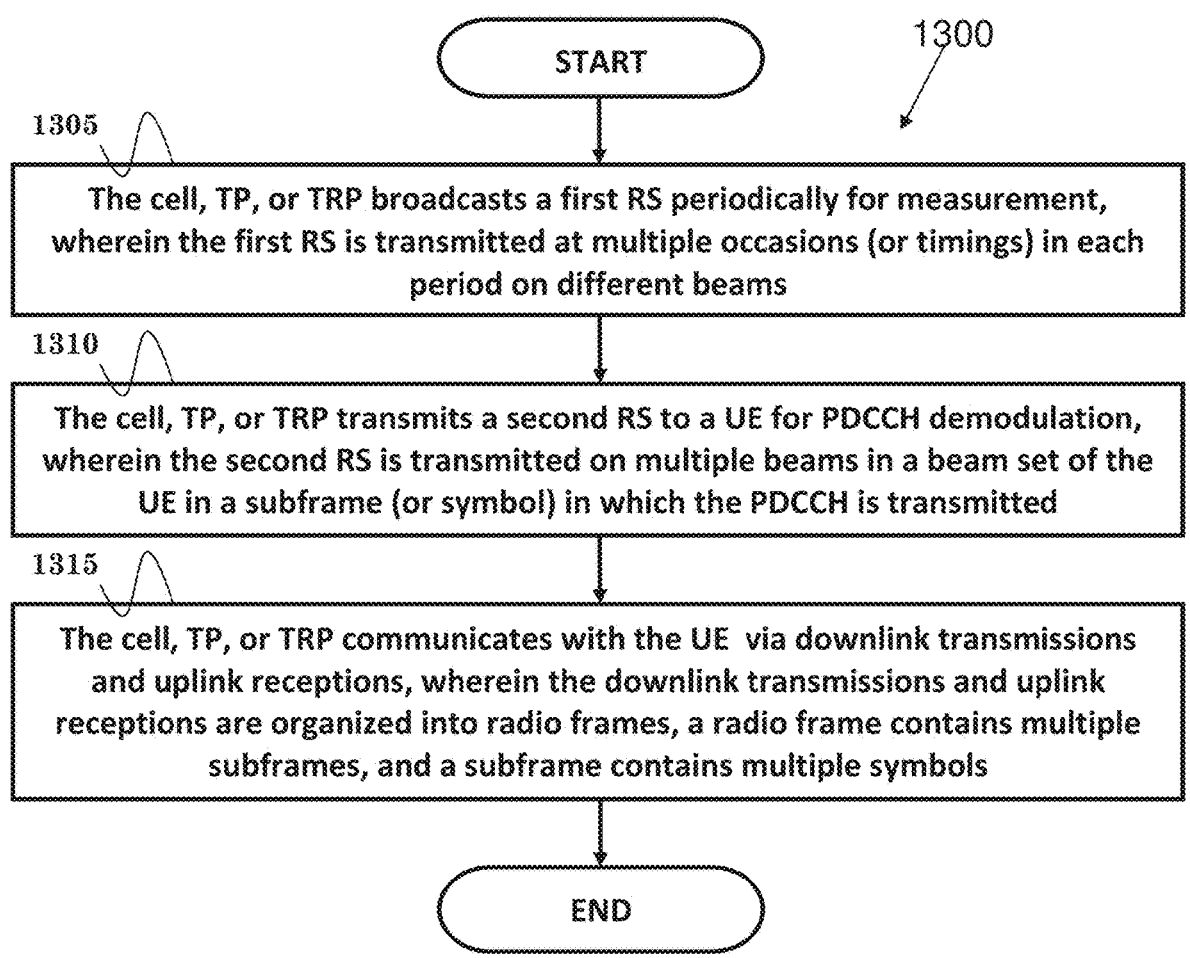
FIG. 13 is a flow chart according to one exemplary embodiment.

FIG. 13 is a flow chart 1300, from the perspective of a cell, transmission point (TP), or transmission and reception point (TRP), in accordance with one exemplary embodiment. In step 1305, the cell, TP, or TRP broadcasts a first RS periodically for measurement, wherein the first RS is transmitted at multiple occasions (or timings) in each period on different beams. In step 1310, the cell, TP, or TRP transmits a second RS to a UE for PDCCH demodulation, wherein the second RS is transmitted on multiple beams in a beam set of the UE in a subframe (or symbol) in which the PDCCH is transmitted. In step 1315, the cell, TP, or TRP communicates with the UE via downlink transmissions and uplink receptions, wherein the downlink transmissions and uplink receptions are organized into radio frames, a radio frame contains multiple subframes, and a subframe contains multiple symbols.

Referring back to FIGS. 3 and 4, in one embodiment from the perspective of a cell, transmission point (TP), or transmission and reception point (TRP), the device 300 includes a program code 312 stored in the memory 310. The CPU 308 could execute program code 312 to enable the cell, TP, or TRP (i) to broadcast a first RS periodically for measurement, wherein the first RS is transmitted at multiple occasions (or timings) in each period on different beams, and (ii) to transmit a second RS to a UE for PDCCH demodulation, wherein the second RS is transmitted on multiple beams in a beam set of the UE in a subframe (or symbol) in which the PDCCH is transmitted. In one embodiment, the CPU could further execute program code 312 to enable the cell, TP, or TRP to communicate with the UE via downlink transmissions and uplink receptions, wherein the downlink transmissions and uplink receptions are organized into radio frames, a radio frame contains multiple subframes, and a subframe contains multiple symbols. Furthermore, the CPU 308 can execute the program code 312 to perform all of the above-described actions and steps or others described herein.

Figure 14:
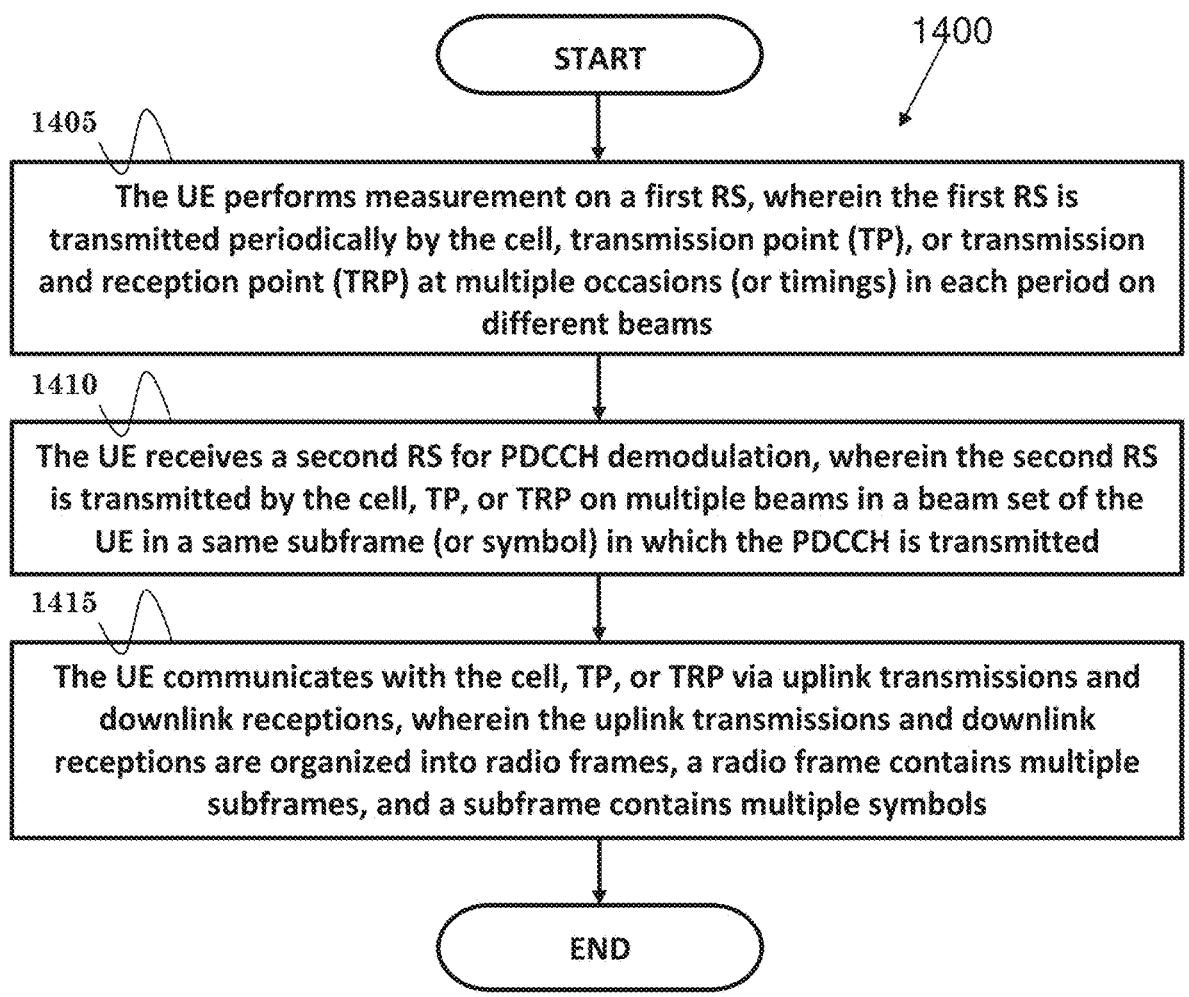
FIG. 14 is a flow chart according to one exemplary embodiment.

FIG. 14 is a flow chart 1400 from the perspective of a UE in accordance with one exemplary embodiment. In step 1405, the UE performs measurement on a first RS, wherein the first RS is transmitted periodically by the cell, transmission point (TP), or transmission and reception point (TRP) at multiple occasions (or timings) in each period on different beams. In step 1410, the UE receives a second RS for PDCCH demodulation, wherein the second RS is transmitted by the cell, TP, or TRP on multiple beams in a beam set of the UE in a same subframe (or symbol) in which the PDCCH is transmitted. In step 1415, The UE communicates with the cell, TP, or TRP via uplink transmissions and downlink receptions, wherein the uplink transmissions and downlink receptions are organized into radio frames, a radio frame contains multiple subframes, and a subframe contains multiple symbols.

Referring back to FIGS. 3 and 4, in one embodiment from the perspective of a UE, the device 300 includes a program code 312 stored in memory 310. The CPU 308 could execute program code 312 to enable the UE (i) to receive a second RS for PDCCH demodulation, wherein the second RS is transmitted periodically by the cell, transmission point (TP), or transmission and reception point (TRP) on multiple beams in a beam set of the UE in a same subframe (or symbol) in which the PDCCH is transmitted, and (ii) to receive a second RS for PDCCH demodulation, wherein the second RS is transmitted by the cell, TP, or TRP on multiple beams in a beam set of the UE in a same subframe (or symbol) in which the PDCCH is transmitted. In one embodiment, the CPU could further execute program code 312 to enable the UE to communicate with the cell, TP, or TRP via uplink transmissions and downlink receptions, wherein the uplink transmissions and downlink receptions are organized into radio frames, a radio frame contains multiple subframes, and a subframe contains multiple symbols. Furthermore, the CPU 308 can execute the program code 312 to perform all of the above-described actions and steps or others described herein.

With respect to the above embodiments, a total number of beams in the cell, TP, or TRP could be fixed. In addition, a direction and a beam width of each beam in the cell, TP, or TRP could be fixed.

In one embodiment, each subframe in the radio frame could contain a downlink control portion, an uplink control portion, and/or a data portion. Furthermore, the first RS and the second RS are transmitted in the downlink control portion. In addition, the downlink transmissions and/or uplink receptions relevant to the UE could be performed by the cell, TP, or TRP on multiple beams in a beam set of the UE.

As mentioned above, SFN may be used for various purposes. UEs served by a cell, TP, or TRP on the capacity layer may still need to know the SFN of the cell, TP, or TRP. Current MIB (Master Information Block) includes information for downlink bandwidth, PHICH (Physical Hybrid ARQ Indicator Channel) configuration, and SFN of the cell, TP, or TRP. Since the UEs connect to the cell, TP, or TRP via dual connectivity, downlink bandwidth and PHICH configuration can be provided via MeNB. However, SFN cannot be provided via MeNB because SFN is changed time by time, and the two base stations (MeNB and SeNB) are possibly connected via a non-ideal backhaul with not fixed and tolerable delay. Under the circumstance, improvement to efficiently provide the SFN to the UEs served by the cell, TP, or TRP should be considered to reduce control signal overhead of the cell, TP, or TRP.

There are different aspects to improve efficiency of providing SFN. The following improvements can be adopted independently or jointly:

The first aspect is the size of a signaling providing SFN. In LTE, SFN is provided by MasterInformationBlock; and MasterInformationBlock also includes dl-Bandwidth and phich-Config. Since it is assumed that the UE connects to the cell, TP, or TRP on the capacity layer by dual connectivity, the cell, TP, or TRP is configured by MeNB based on negotiation between MeNB and SeNB, as discussed in 3GPP TS 36.331. Then, since dl-Bandwidth and phich-Config are not changed dynamically, dl-Bandwidth and phich-Config could be provided via MeNB when configuring the cell, TP, or TRP. Then, the signaling providing SFN does not need to include dl-Bandwidth and phich-Config. The overhead of the signaling can be reduced.

The second aspect is the length of the time interval to provide SFN. The length of the time interval is related to efficiency of providing SFN. Therefore, the general concept is that the complete SFN should be transmitted in one symbol of a subframe. Since only one symbol is used for SFN omnidirectional transmission or for providing SFN on some beams, the cost to provide SFN could be minimized, and the UE power consumption for SFN reception could be reduced.

The third aspect is that if SFN could be transmitted together with other information which has similar characteristic as SFN (e.g., the information to be provided periodically and required for all UEs), SFN could be provided efficiently (e.g., to increase resource efficiency and reduce UE power consumption for reception). Therefore, the general concept is that the complete SFN or a part of SFN is transmitted in a symbol of a subframe where a synchronization signal is transmitted. More specifically, SFN and the synchronization signal could have different transmission periodicity. Alternatively, the transmission periodicity of SFN could be equal to or larger than the transmission periodicity of the synchronization signal. More specifically, the transmission periodicity of SFN could be a multiple of the transmission periodicity of the synchronization signal.

A network node controlling the cell, TP, or TRP could adopt the above improvement(s) to perform corresponding transmission(s). A UE served by the cell, TP, or TRP could also adopt the above improvement(s) to perform corresponding reception(s).

Figure 15:
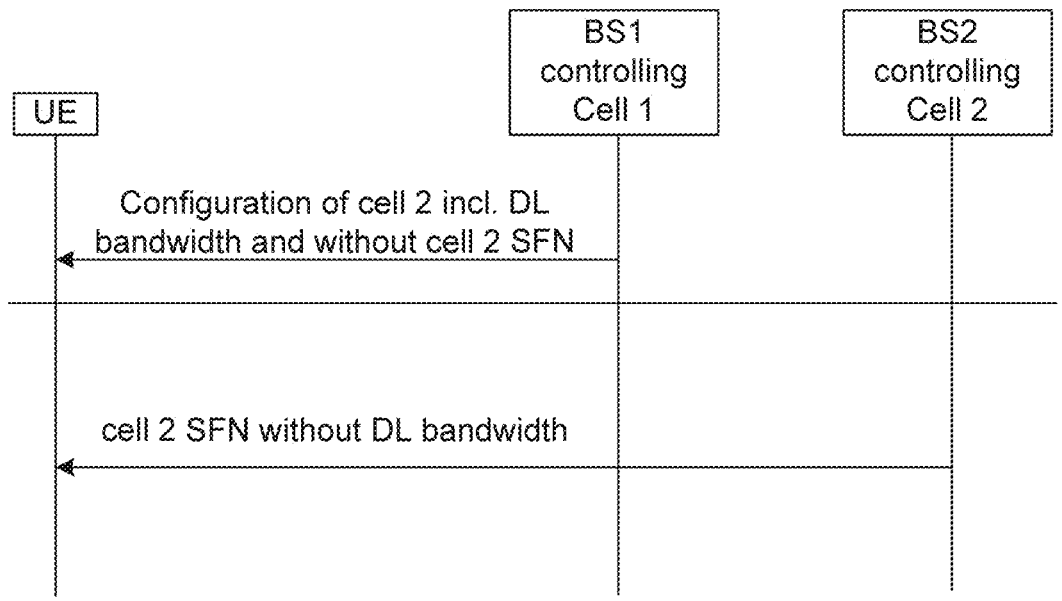
FIG. 15 is a message flow diagram according to one exemplary embodiment.
Figure 16:
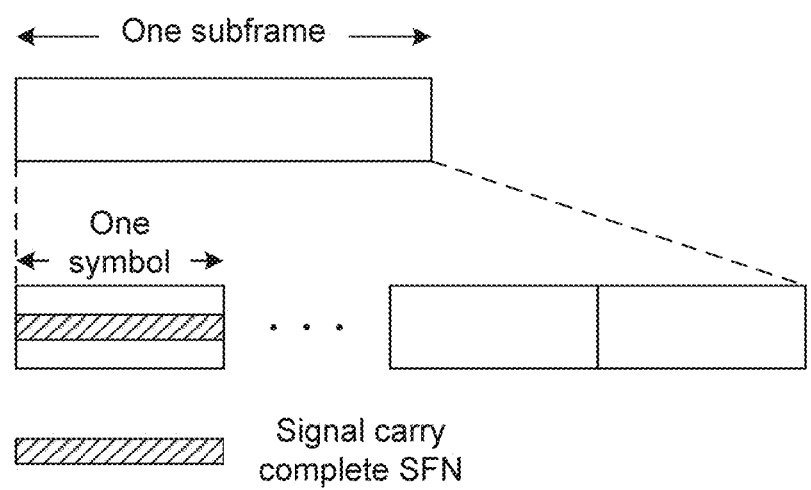
FIG. 16 is a block diagram according to one exemplary embodiment.
Figure 17:
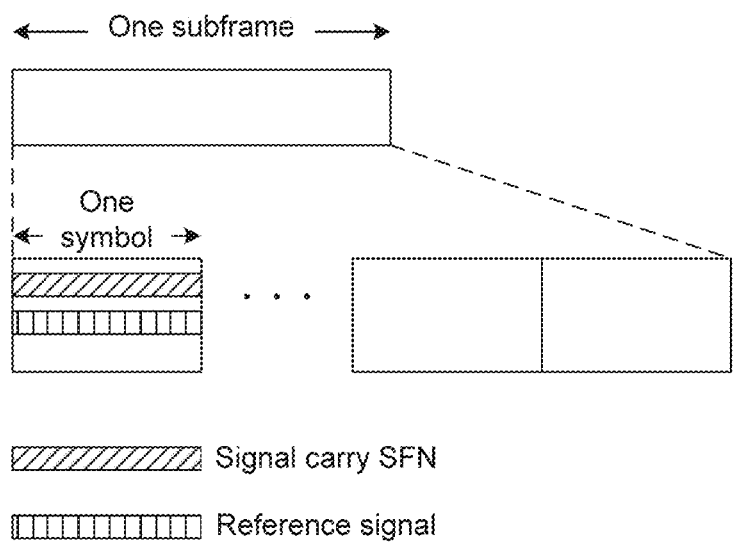
FIG. 17 is a block diagram according to one exemplary embodiment.

FIGS. 15-17 illustrate exemplary embodiments of the invention. Furthermore, in an alternative embodiment, the invention could be applied to the physical subframe structure for a UDN (Ultra Dense Network) shown in FIG. 10.

FIG. 15 is an exemplary embodiment of how UE obtains a SFN as well as a DL bandwidth information of cell 2 controlled by BS (base station) 2. The DL bandwidth could be provided via cell 1 controlled by BS 1, e.g., MeNB, in configuration which doesn't include the SFN of cell 2. Then, the SFN of cell 2 is provided via cell 2 in a signaling which does not include DL bandwidth information of cell 2. The overhead of the signaling carrying SFN can be reduced.

FIG. 16 is an exemplary embodiment of how to signal a SFN. A complete SFN is transmitted in one symbol of a subframe. And the signaling carrying the SFN may not occupy or spread in whole bandwidth. Since only one symbol is used for the SFN omnidirectional transmission or providing the SFN on some beams, the cost to provide SFN can be minimized, and the UE power consumption for the SFN reception can be reduced.

FIG. 17 is an exemplary embodiment of how to signal a SFN and a reference signal in one symbol. The SFN is transmitted in a symbol of a subframe where a reference signal is transmitted. The SFN and the reference signal occupy different frequency resource within the symbol.

Figure 18:
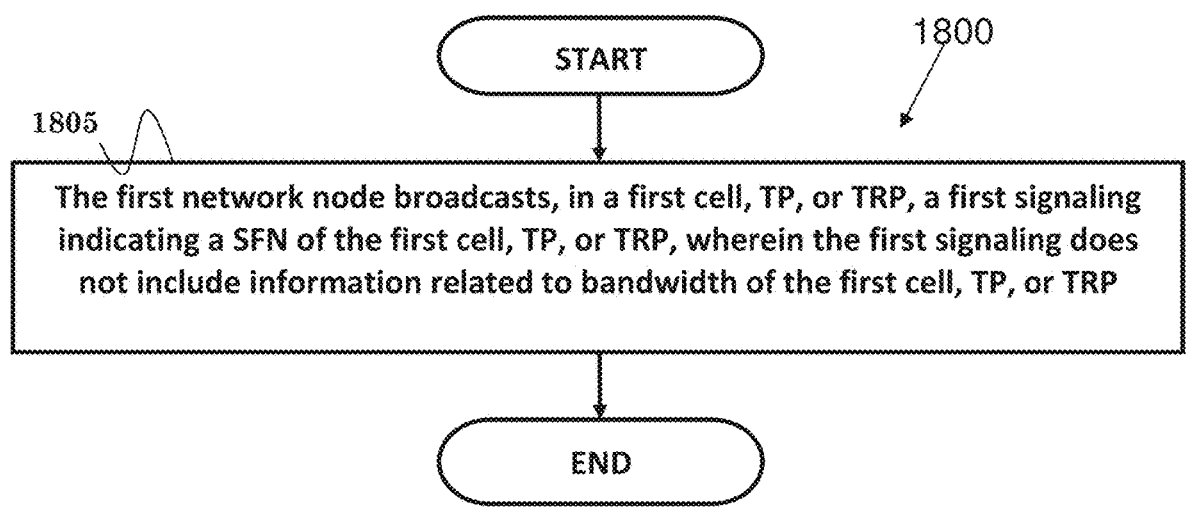
FIG. 18 is a flow chart according to one exemplary embodiment.

FIG. 18 is a flow chart 1800 in accordance with one exemplary embodiment from the perspective of a network node. The flow chart 1800 generally illustrates a method for a first network node to control a first cell, TP, or TRP. In step 1805, the first network node broadcasts, in the first cell, TP, or TRP, a first signaling indicating a SFN of the first cell, TP, or TRP, wherein the first signaling does not include information related to bandwidth of the first cell, TP, or TRP.

Referring back to FIGS. 3 and 4, the device 300 includes a program code 312 stored in memory 310 of the transmitter. The CPU 308 could execute program code 312 to enable a first network node to broadcast, in a first cell, TP, or TRP, a first signaling indicating a SFN of the first cell, TP, or TRP, wherein the first signaling does not include information related to bandwidth of the first cell, TP, or TRP. In addition, the CPU 308 can execute the program code 312 to perform all of the above-described actions and steps or others described herein.

Figure 19:
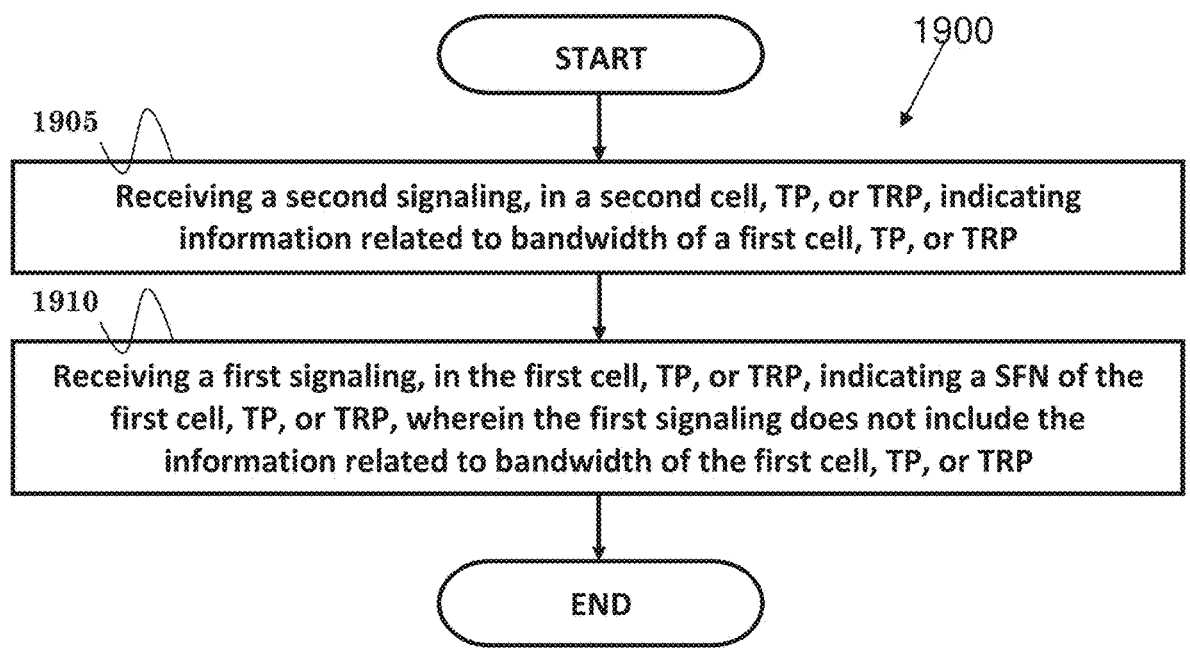
FIG. 19 is a flow chart according to one exemplary embodiment.

FIG. 19 is a flow chart 1900, in accordance with one exemplary embodiment from the perspective of a UE. In step 1905, the UE receives a second signaling, in a second cell, TP, or TRP, indicating information related to bandwidth of a first cell, TP, or TRP. In step 1910, the UE receives a first signaling, in the first cell, TP, or TRP, indicating a SFN of the first cell, TP, or TRP, wherein the first signaling does not include the information related to bandwidth of the first cell, TP, or TRP.

Referring back to FIGS. 3 and 4, in one embodiment from the perspective of a UE, the device 300 includes a program code 312 stored in memory 310 of the transmitter. The CPU 308 could execute program code 312 to enable the UE (i) to receive a second signaling, in a second cell, TP, or TRP, indicating information related to bandwidth of a first cell, TP, or TRP, and (ii) to receive a first signaling, in the first cell, TP, or TRP, indicating a SFN of the first cell, TP, or TRP, wherein the first signaling does not include the information related to bandwidth of the first cell, TP, or TRP. In addition, the CPU 308 can execute the program code 312 to perform all of the above-described actions and steps or others described herein.

With respect to the above embodiments, the first cell, TP, or TRP could be controlled by the first network node. Furthermore, the second cell could be a MCG (Master Cell Group) cell. In addition the second cell, TP, or TRP could be in a coverage layer, and could be controlled by a second network node. The second network node could be a base station or a MeNB.

In one embodiment, the second signaling could configure the first cell, TP, or TRP as a serving cell, TP, or TRP for the UE. The second signaling could indicate a configuration for PHICH. Furthermore, the UE could be connected to the first cell, TP, or TRP and the second cell, TP, or TRP by dual connectivity (e.g., the first cell, TP, or TRP and the second cell, TP, or TRP are controlled by different network nodes).

Figure 20:
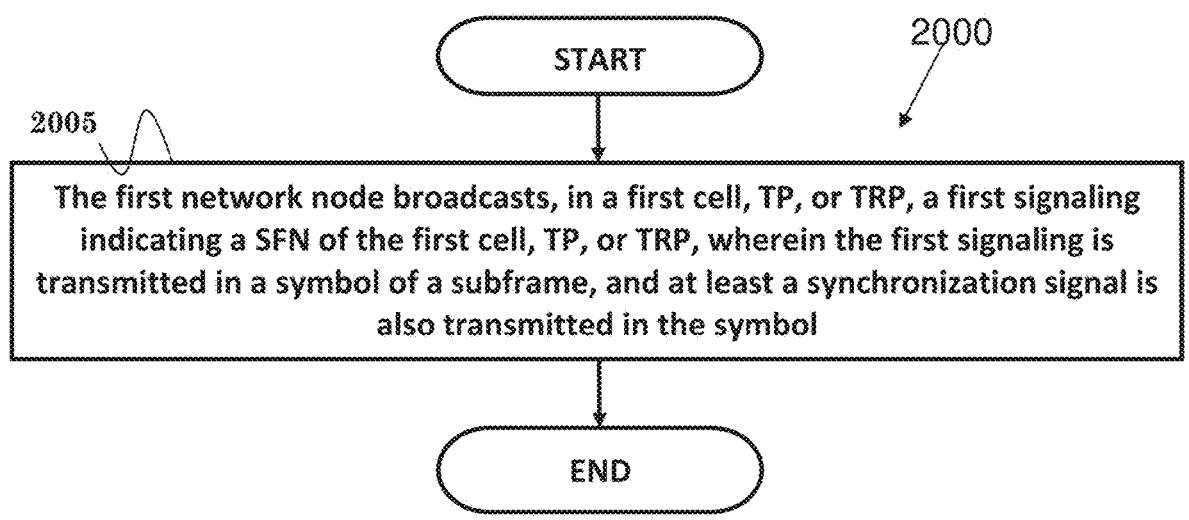
FIG. 20 is a flow chart according to one exemplary embodiment.

FIG. 20 is a flow chart 2000 in accordance with one exemplary embodiment from the perspective of a network node. The flow chart 2000 generally illustrates a method for a first network node to control a first cell, TP, or TRP. In step 2005, the first network node broadcasts, in the first cell, TP, or TRP controlled by the first network node, a first signaling indicating a SFN of the first cell, TP, or TRP, wherein the first signaling is transmitted in a symbol of a subframe, and the symbol also carries at least a synchronization signal.

Referring back to FIGS. 3 and 4, in one embodiment from the perspective of a first network node, the device 300 includes a program code 312 stored in memory 310 of the transmitter. The CPU 308 could execute program code 312 (i) to broadcast a first signaling indicating a SFN of a first cell, TP, or TRP controlled by the first network node, wherein the first signaling is transmitted in a symbol of a subframe, and the symbol also carries at least a synchronization signal. In addition, the CPU 308 can execute the program code 312 to perform all of the above-described actions and steps or others described herein.

Figure 21:
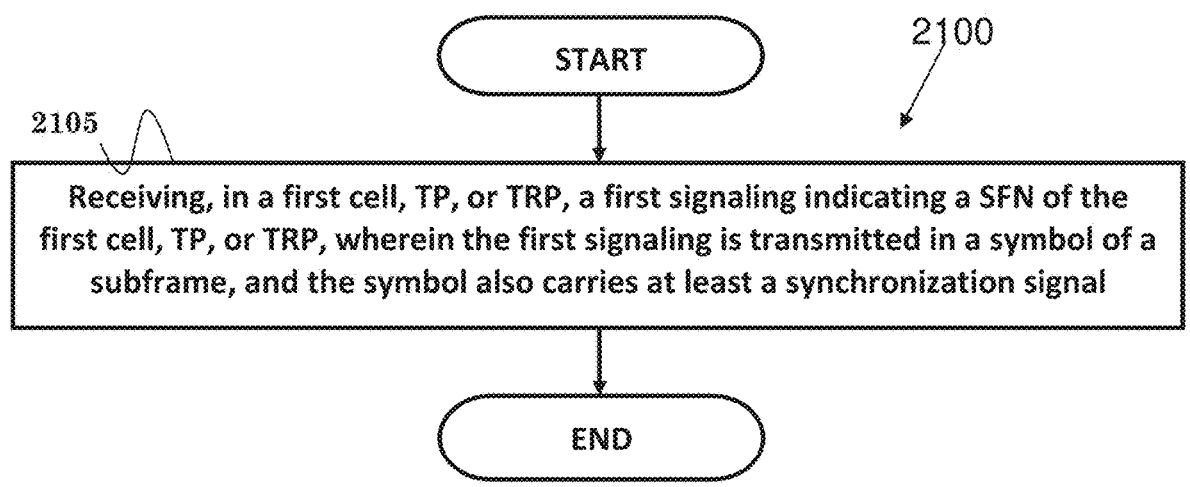
FIG. 21 is a flow chart according to one exemplary embodiment.

FIG. 21 is a flow chart 2100 in accordance with one exemplary embodiment from the perspective of a UE. In step 2105, the UE receives, in a first cell, TP, or TRP, a first signaling indicating a SFN of the first cell, TP, or TRP, wherein the first signaling is transmitted in a symbol of a subframe, and the symbol also carries at least a synchronization signal.

Referring back to FIGS. 3 and 4, in one embodiment from the perspective of a UE, the device 300 includes a program code 312 stored in memory 310 of the transmitter. The CPU 308 could execute program code 312 to enable the UE to receive, in a first cell, TP, or TRP, a first signaling indicating a SFN of the first cell, TP, or TRP, wherein the first signaling is transmitted in a symbol of a subframe, and the symbol also carries at least a synchronization signal. In addition, the CPU 308 can execute the program code 312 to perform all of the above-described actions and steps or others described herein.

With respect to the above embodiments, the UE could also receive the synchronization signal in the same symbol of the subframe. In one embodiment, the synchronization signal could occupy more than one symbol of the subframe. Alternatively, the synchronization signal only occupies the symbol of the subframe, i.e., the complete synchronization signal can be transmitted in one symbol. Furthermore, the first signaling could occupy more than one symbol of the subframe. Alternatively, the first signaling only occupies the symbol of the subframe, i.e., the complete first signaling can be transmitted in one symbol. In one embodiment, the symbol could include a field to convey the first signaling.

In one embodiment, the first signaling and the synchronization signal could have different transmission periodicities. The transmission periodicity of the first signaling could be larger than transmission periodicity of the synchronization signal. Transmission periodicity of the first signaling could be a multiple of transmission periodicity of the synchronization signal. Alternatively, transmission periodicity of the first signaling is equal to transmission periodicity of the synchronization signal.

In one embodiment, the symbol could be for beam forming or for omnidirectional transmission. In addition, the symbol could be an OFDM (Orthogonal Frequency Division Multiplexing) symbol. The symbol could be the first symbol in a subframe, the last symbol in a subframe, or the last symbol in a control region (or control portion) of a subframe. Furthermore, the synchronization signal could be a PSS (Primary Synchronization Signal) or a SSS (Secondary Synchronization Signal).

In one embodiment, the first signaling does not indicate configuration for PHICH. Alternatively, the first signaling could indicate the SFN only but no other configuration. Furthermore, the first signaling could be a system information, a MasterInformationBlock, a Random Access Response, or a MAC (Medium Access Control) control element. In addition, the first signaling could be broadcasted, transmitted periodically, transmitted by beam forming, and/or transmitted in the control region (or control portion) of a subframe. Furthermore, the transmission of the first signaling could be omnidirectional.

In one embodiment, the first signaling could indicate partial bits of the SFN, n most significant bits of the SFN, or all bits of the SFN.

In one embodiment, the first network node could be a base station, or a SeNB. In addition, the first cell could be a SCG cell and/or could be in the capacity layer.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a network node to transmit System Frame Number (SFN) for identifying a frame number of a radio frame in a cell controlled by the network node in a wireless communication system in which transmissions are organized into radio frames, where one radio frame contains multiple subframes and one subframe contains Orthogonal Frequency Division Multiplexing (OFDM) symbols, comprising:
   broadcasting, by the network node, a synchronization signal in an OFDM symbol of a subframe; and
   broadcasting, by the network node, a signaling indicating the SFN of the cell controlled by the network node in (i) the same OFDM symbol of the subframe used for broadcasting the synchronization signal and (ii) one or more other OFDM symbols of the subframe.

2. The method of claim 1, wherein the signaling and the synchronization signal occupy different frequency resources within the OFDM symbol used for broadcasting the synchronization signal.

3. The method of claim 1, wherein the signaling is MasterInformationBlock.

4. The method of claim 1, wherein the synchronization signal only occupies one OFDM symbol of the subframe.

5. The method of claim 1, wherein the synchronization signal is a secondary synchronization signal.

6. The method of claim 1, wherein transmission periodicity of the signaling is equal to transmission periodicity of the synchronization signal.

7. A network node for transmitting System Frame Number (SFN) for identifying a frame number of a radio frame in a cell controlled by the network node in a wireless communication system in which transmissions are organized into radio frames, where one radio frame contains multiple subframes and one subframe contains Orthogonal Frequency Division Multiplexing (OFDM) symbols, comprising:
   a control circuit;
   a processor installed in the control circuit; and
   a memory installed in the control circuit and operatively coupled to the processor; wherein that the processor is configured to execute a program code stored in the memory to:
      broadcast, by the network node, a synchronization signal in an OFDM symbol of a subframe; and
      broadcast, by the network node, a signaling indicating the SFN of the cell controlled by the network node in (i) the same OFDM symbol of the subframe used for broadcasting the synchronization signal and (ii) one or more other OFDM symbols of the subframe.

8. The network node of claim 7, wherein the signaling and the synchronization signal occupy different frequency resources within the OFDM symbol used for broadcasting the synchronization signal.

9. The network node of claim 7, wherein the signaling is MasterInformationBlock.

10. The network node of claim 7, wherein the synchronization signal only occupies one OFDM symbol of the subframe.

11. The network node of claim 7, wherein the synchronization signal is a secondary synchronization signal.

12. The network node of claim 7, wherein transmission periodicity of the signaling is equal to transmission periodicity of the synchronization signal.

13. The method of claim 5, wherein the one or more other OFDM symbols does not include a second OFDM symbol of the subframe used for broadcasting a primary synchronization signal.

14. The network node of claim 11, wherein the one or more other OFDM symbols does not include a second OFDM symbol of the subframe used for broadcasting a primary synchronization signal.

* * * * *